United States Patent [19]

Liang

[11] Patent Number: 4,647,461

[45] Date of Patent: Mar. 3, 1987

[54] METHOD FOR MAKING A RELIEF ON AN EGGSHELL

[76] Inventor: Meng J. Liang, 54,Dian Tzy Ding Rd., Tzo Inn Dis. Kaohsiung, Taiwan, 813

[21] Appl. No.: 751,495

[22] Filed: Jul. 3, 1985

[51] Int. Cl.[4] .......................... B44C 1/22; A23G 1/00; A23L 1/27; A23B 5/00

[52] U.S. Cl. .................................... 426/104; 156/625; 156/654; 156/659.1; 156/61; 252/79.1; 252/79.4; 426/249; 426/299; 426/383; 428/15

[58] Field of Search ...................... 156/654, 659.1, 625, 156/57, 61; 428/15; 252/79.1, 79.4; 430/323; 426/298, 299, 383, 249, 250, 254, 104

[56] References Cited

U.S. PATENT DOCUMENTS 788,129 4/1905 Becher ............................ 156/659.1

3,791,895 2/1974 LeVan ............................. 156/61 X 4,371,555 2/1983 Tully ............................... 426/383 X 4,599,235 7/1986 Miller et al. ...................... 156/61 X

FOREIGN PATENT DOCUMENTS 0024721 8/1900 United Kingdom ............ 156/659.1

*Primary Examiner*—William A. Powell
*Attorney, Agent, or Firm*—Holman & Stern

[57] ABSTRACT

This invention concerns about a method for making a relief on an eggshell. The method is, first, to cut out a design with paper and then adhere it on an eggshell, which is afterwards immersed into an acetic acid solution, making the part on the eggshell exposed to the acetic acid solution can be etched by neutralization reaction between the eggshell and the acetic acid and therefore the part not etched where the paper was adhered on the eggshell looks like a relief.

3 Claims, No Drawings

METHOD FOR MAKING A RELIEF ON AN EGGSHELL

BACKGROUND OF THE INVENTION

Relief, an artistic and decorative work, is usually done on wood or concrete or those materials which are either hard or thick. As for an eggshell, since it is very thin and fragile, a relief can not be formed on it by using any kind of knives. But, if possible, it may acquire commercial value and make people interested. In order to attain the aim, the inventor has tried hard and finally worked out this invention.

DETAILED DESCRIPTION OF THE INVENTION

The process of the invention is described as follows. First, cut out a desired design or strip with a paper and adhere it on the surface of an egg. Then immerse the egg in an acetic acid solution containing 20% of $CH_3COOH$ and 80% of $H_2O$ for 90 minutes; a shorter immersion than 90 minutes is unable to obtain a clear relief but a longer one than 90 minutes may break the eggshell.

The equation of the reaction is stated as follows.

$$2CH_3COOH+CaCO_3 \rightarrow Ca(CH_3COO)_2+CO_2+H_2O$$

Next, take off the paper adhered on the eggshell and a relief of the same form of the paper appears on it because the part of the eggshell that was adhered with the paper did not react with the acetic acid.

Finally, sting on each end of the egg a little hole and suck the yolk and protein out of the shell by means of a syringe; then sterilize the inside with alcohol and let it dry and keep it dry.

Of course, a finished eggshell can be painted with colors to become more beautiful.

Conclusively, this invention, a method for making a relief on an egg, really provides a special method to obtain a variety of relief of artistic and decorative value on a thin and fragile eggshell without using a knife.

I claim:

1. A method for making relief on an eggshell, comprising the steps of:

cutting out a design from a sheet of paper first and adhering said design on the surface of an egg, immersing the egg in an acetic acid solution containing 20% of $CH_3COOH$ and 80% of $H_2O$ for 90 minutes and peeling the paper off the eggshell and sucking out the yolk and protein inside the egg by means of a syringe, sterilizing with alcohol and keeping it dry.

2. The method according to claim 1 of coloring the surface of the dry eggshell.

3. An eggshell having a relief made thereon by the method of claim 1.

* * * * *